United States Patent
Yang et al.

(10) Patent No.: US 10,164,683 B2
(45) Date of Patent: Dec. 25, 2018

(54) METHOD FOR RECEIVING INTERFERENCE CANCELLATION

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,030

(22) PCT Filed: Jul. 29, 2015

(86) PCT No.: PCT/KR2015/007925
§ 371 (c)(1),
(2) Date: Jan. 12, 2017

(87) PCT Pub. No.: WO2016/021866
PCT Pub. Date: Feb. 11, 2016

(65) Prior Publication Data
US 2017/0207898 A1 Jul. 20, 2017

Related U.S. Application Data

(60) Provisional application No. 62/034,785, filed on Aug. 8, 2014, provisional application No. 62/034,784, filed on Aug. 8, 2014.

(51) Int. Cl.
*H04B 1/7107* (2011.01)
*H04J 11/00* (2006.01)
(Continued)

(52) U.S. Cl.
CPC ............ *H04B 1/7107* (2013.01); *H04J 11/00* (2013.01); *H04J 11/004* (2013.01); *H04J 11/005* (2013.01);
(Continued)

(58) Field of Classification Search
CPC . H04B 1/7107; H04J 11/0036; H04J 11/0056; H04L 5/0073; H04L 5/0048; H04W 72/082; H04W 72/085
See application file for complete search history.

(56) References Cited

U.S. PATENT DOCUMENTS

2011/0267937 A1 11/2011 Yoo et al.
2013/0273930 A1 10/2013 Damnjanovic et al.
(Continued)

FOREIGN PATENT DOCUMENTS

WO 2014107850 A1 7/2014

OTHER PUBLICATIONS

MediaTek Inc., "Blind detection results of necessary parameters for interference with CRS-based TM", 3GPP RAN4 #70b, R4-141734, Apr. 9, 2014, 4 pages.
(Continued)

*Primary Examiner* — Kwang B Yao
*Assistant Examiner* — Moo Jeong
(74) *Attorney, Agent, or Firm* — Lee, Hong, Degerman, Kang & Waimey

(57) ABSTRACT

One disclosure of the present specification provides a method for receiving interference cancellation. The method for receiving interference cancellation can comprise: a step for cancelling, in signals received from a serving cell, cell-specific reference signals (CRS) from the serving cell, the CRS from a first primary interference cell, and the CRS from a second primary interference cell; a step for comparing the signal size of the serving cell, the signal size of the
(Continued)

first primary interference cell, and the signal size of the second primary interference cell; a step for determining whether the CRS of the serving cell conflicts with the CRS of the first primary interference cell or the CRS of the second primary interference cell; and a step for canceling, when it is determined that the CRS' conflict with one other, data signals from the first primary interference cell and data signals from the second primary interference cell in the signals where the CRS are cancelled in the order determined according to the size comparison of signals.

10 Claims, 22 Drawing Sheets

(51) Int. Cl.
*H04L 5/00* (2006.01)
*H04W 72/08* (2009.01)

(52) U.S. Cl.
CPC ....... *H04J 11/0036* (2013.01); *H04J 11/0056* (2013.01); *H04L 5/0048* (2013.01); *H04L 5/0073* (2013.01); *H04W 72/082* (2013.01); *H04W 72/085* (2013.01); *H04L 5/001* (2013.01); *H04L 5/005* (2013.01)

(56) References Cited

U.S. PATENT DOCUMENTS

2014/0086371 A1* 3/2014 Li ..................... H04J 11/005
                                                                375/346
2014/0241245 A1* 8/2014 Berberana ........... H04J 11/0056
                                                                370/328

OTHER PUBLICATIONS

3rd Generation Partnership Project, "Technical Specification Group Radio Access Network; Evolved Universal Terrestrial Radio Access (E-UTRA); Physical Channels and Modulation (Release 10)", 3GPP TS 36.211 V10.4.0, Dec. 2011, Section 5, pp. 11-50 (42 pages provided).
PCT International Application No. PCT/KR2015/007925, International Search Report dated Nov. 6, 2015, 2 pages.

* cited by examiner

US 10,164,683 B2

METHOD FOR RECEIVING INTERFERENCE CANCELLATION

CROSS-REFERENCE TO RELATED APPLICATIONS

This application is the National Stage filing under 35 U.S.C. 371 of International Application No. PCT/KR2015/007925, filed on Jul. 29, 2015, which claims the benefit of U.S. Provisional Application No. 62/034,784, filed on Aug. 8, 2014, and 62/034,785, filed on Aug. 8, 2014, the contents of which are all hereby incorporated by reference herein in their entirety.

FIELD OF THE INVENTION

The present invention relates to mobile communication.

RELATED ART

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, it is expected that small cells with small cell coverage are added to the coverage of a macrocell in a next-generation mobile communication system.

The addition of small cells may further aggravate inter-cell interference.

SUMMARY OF THE INVENTION

Accordingly, a disclosure of the present specification has been made in an effort to solve the aforementioned problem.

To achieve the foregoing object of the present invention, one disclosure of the present specification provides a interference cancellation reception method. The method for receiving interference cancellation may include: removing, from signals received from a serving cell, a cell-specific reference signal (CRS) from the serving cell, a CRS from a first primary interfering cell, and a CRS from a second primary interfering cell; comparing signal strength of the serving cell, signal strength of the first primary interfering cell, and signal strength of the second primary interfering cell; determining whether the CRS of the serving cell collides with the CRS of the first primary interfering cell and the CRS of the second primary interfering cell; and removing, from the signals from which the CRSs are removed, a data signal from the first primary interfering cell and a data signal from the second primary interfering cell according to an order determined by comparing the signal strengths when it is determined that the CRSs collide with each other.

The method may further include removing, from the signals from which the CRSs are removed, part of the data signals from the first primary interfering cell and part of the data signals from the second primary interfering cell according to the order determined by comparing the signal strengths when it is determined that the CRSs do not collide with each other.

The method may further include removing, from the signals from which the CRSs are removed, part of the data signal from the first primary interfering cell and part of the data signal from the second primary interfering cell according to the order determined by comparing the signal strengths when it is determined that the CRS of the serving cell collides with only one of the CRS of the first primary interfering cell and the CRS of the second primary interfering cell.

According to disclosures of the present specification, even though inter-cell interference increases, signal reception performance may be improved by interference cancellation.

DESCRIPTION OF EXEMPLARY EMBODIMENTS

Figure 1:
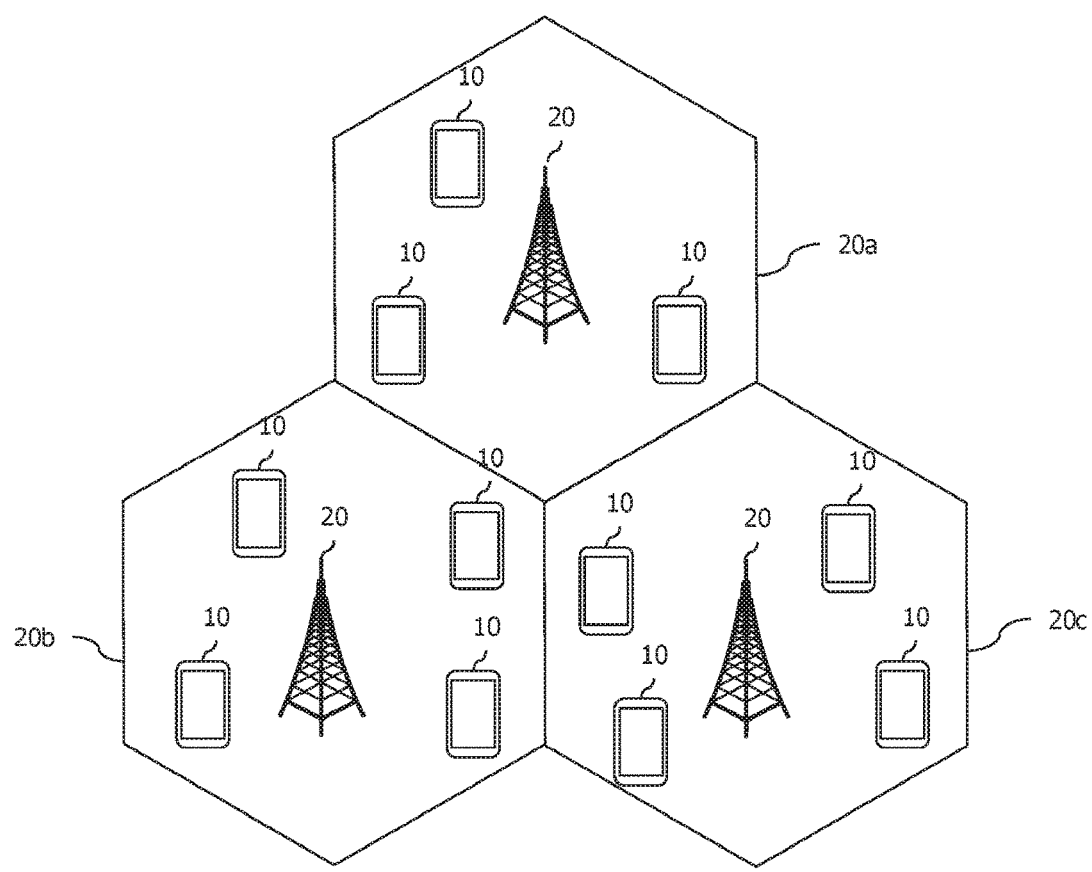
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
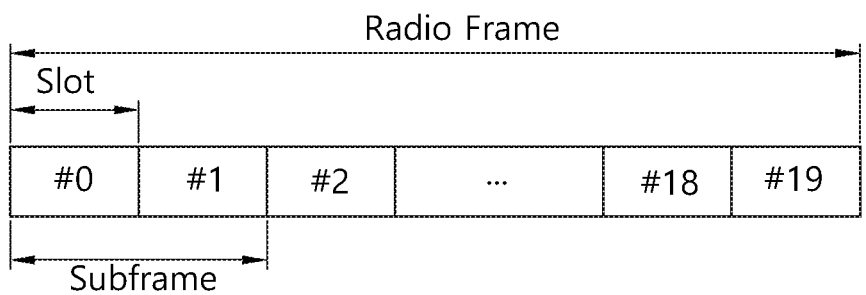
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
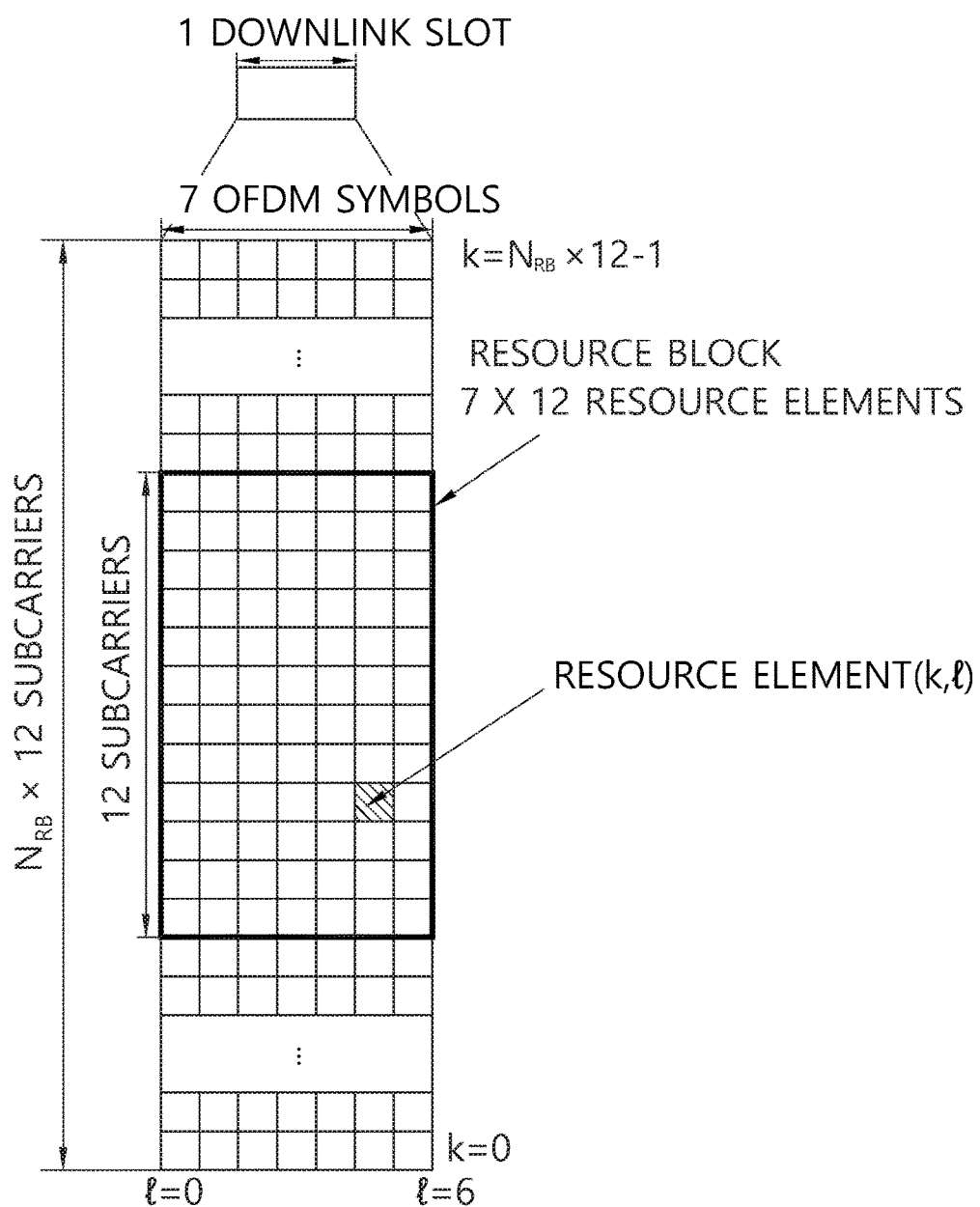
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
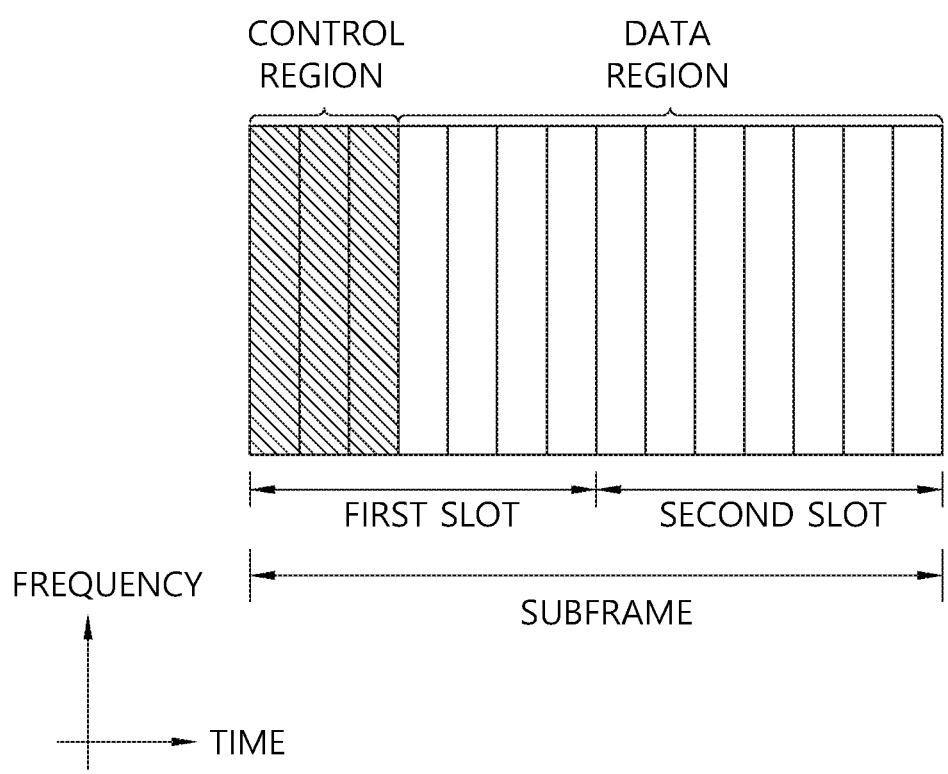
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
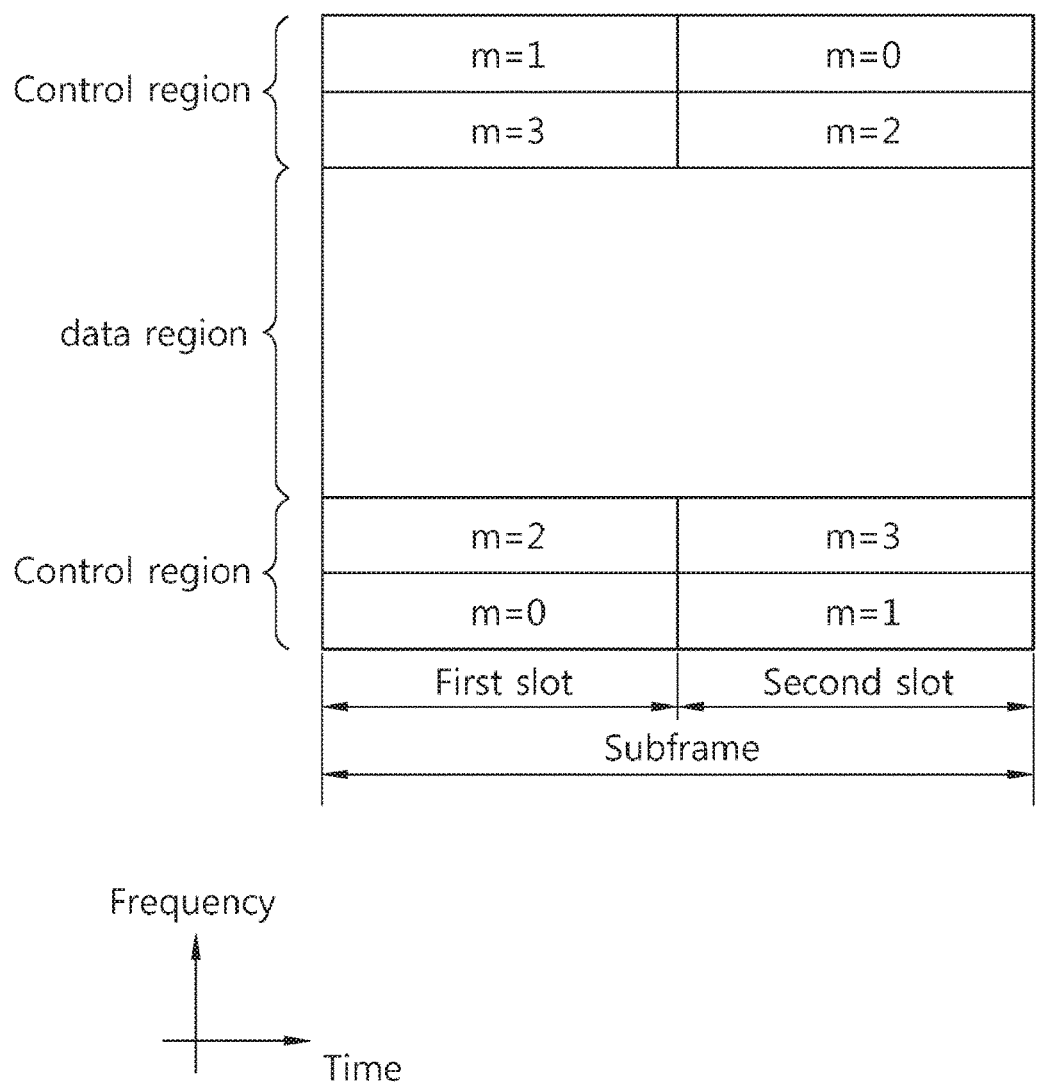
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only the bandwidths of the 3GPP LTE system. Alternatively, the wideband may be configured by not using the bandwidth of the existing system but defining a new bandwidth.

Meanwhile, in order to transmit/receive packet data through a specific secondary cell in the carrier aggregation, the UE first needs to complete configuration for the specific secondary cell. Herein, the configuration means a state in which receiving system information required for data transmission/reception for the corresponding cell is completed. For example, the configuration may include all processes that receive common physical layer parameters required for the data transmission/reception, media access control (MAC) layer parameters, or parameters required for a specific operation in an RRC layer. When the configuration-completed cell receives only information indicating that the packet data may be transmitted, the configuration-completed cell may immediately transmit/receive the packet.

The configuration-completed cell may be present in an activation or deactivation state. Herein, the activation transmitting or receiving the data or a ready state for transmitting or receiving the data. The UE may monitor or receive the control channel (PDCCH) and the data channel (PDSCH) of the activated cell in order to verify resources (a frequency, a time, and the like) assigned thereto.

The deactivation represents that transmitting or receiving traffic data is impossible or measurement or transmitting/receiving minimum information is possible. The UE may receive system information SI required for receiving the packet from the deactivated cell. On the contrary, the UE does not monitor or receive the control channel (PDCCH) and the data channel (PDSCH) of the deactivated cell in order to verify the resources (the frequency, the time, and the like) assigned thereto.

Figure 6:
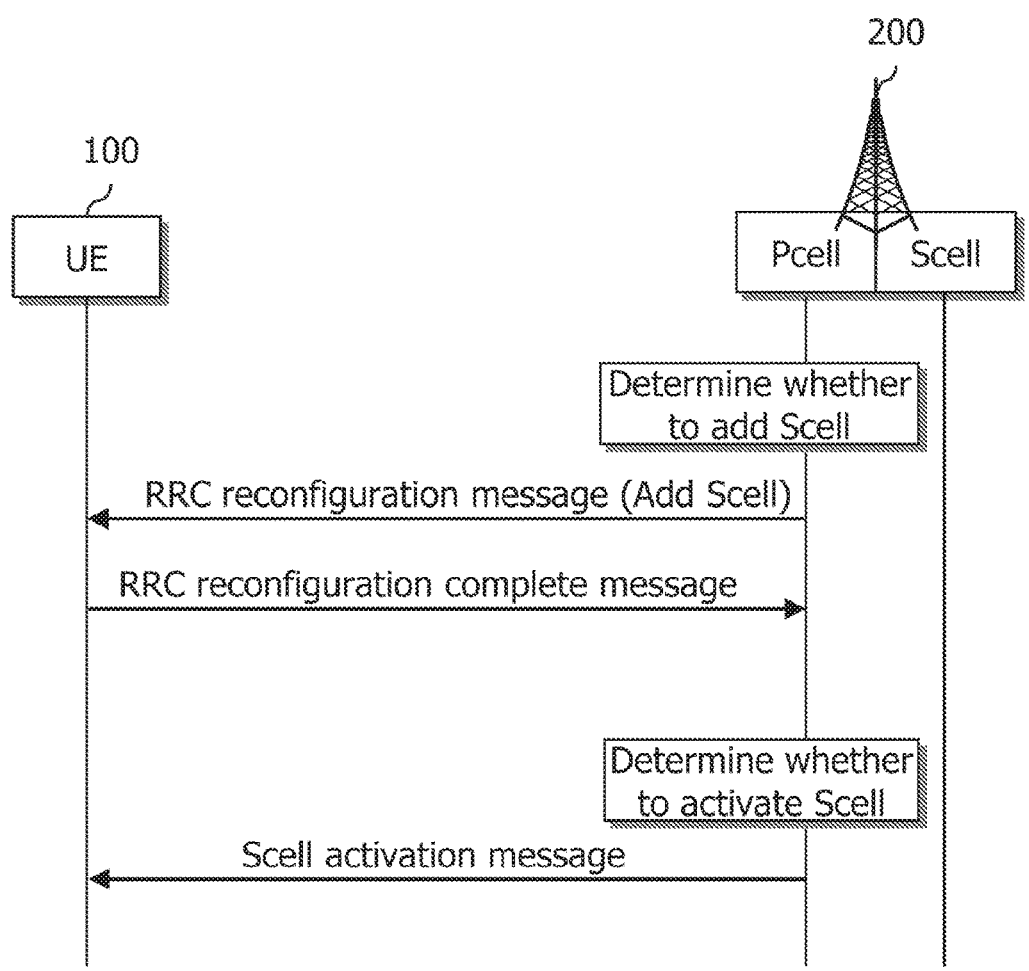
FIG. 6 illustrates inter-cell interference.

FIG. 6 illustrates inter-cell interference.

As illustrated in FIG. 6, when a UE 100 is located in an overlapping area of the coverage of a first cell 200a and the coverage of a second cell 200b, a signal of the first cell 200a acts as an interference with a second signal of the second cell 200b, while a signal of the second cell 200b acts as interference with a signal of the first cell 200a.

A basic method for addressing such an interference problem is using different frequencies for cells. However, since a frequency is a scarce and expensive resource, wireless service providers do not prefer a frequency division method.

Thus, the 3GPP employs a time division method to resolve the inter-cell interference problem.

Accordingly, the 3GPP has actively conducted studies on enhanced inter-cell interference coordination (eICIC) as an interference coordination method in recent years.

A time division method introduced in LTE-Release 10 has evolved as compared with a conventional frequency division method and thus is referred to as an enhanced ICIC. According to the time division method, an aggressor cell, which is a cell causing interference, suspends data transmission in a particular subframe so that a UE maintains connection to a victim cell, which is a cell undergoing the interference, in the subframe. That is, in the time division method, when different types of cells coexist, one cell temporarily suspends transmitting a signal to a UE having considerably high interference, thereby hardly sending an interference signal.

Meanwhile, the particular subframe in which data transmission is suspended is referred to as an almost blank subframe (ABS), in which no data is transmitted except for essential control data. The essential control data is, for example, a cell-specific reference signal (CRS). Therefore, not data but only CRSs are transmitted on OFDM symbols 0, 4, 7, and 11 in an ABS.

Figure 7:
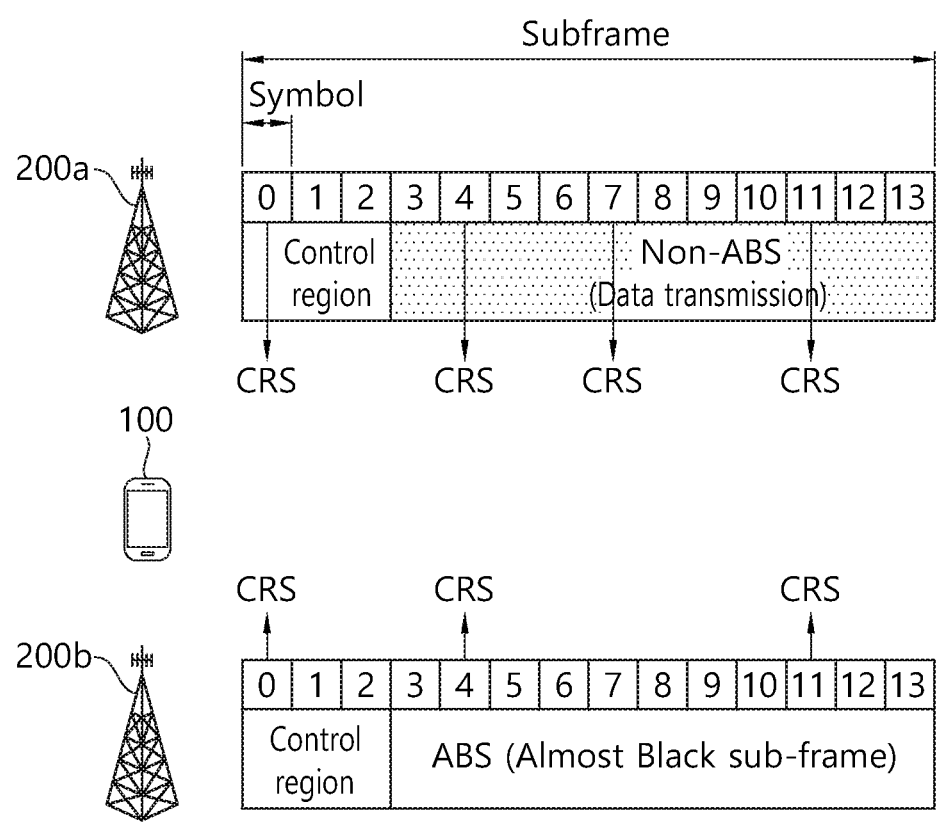
FIG. 7 illustrates enhanced inter-cell interference coordination (eICIC) to address interference between base stations.

FIG. 7 illustrates eICIC to address interference between BSs.

Referring to FIG. 7, data transmission is performed via a data region of a subframe for a first cell 200a.

Here, a second cell 200b applies eICIC to address interference. That is, when the eICIC is applied, a corresponding subframe is managed as an ABS, so that no data may be transmitted via the data region.

In the subframe managed as the ABS, only CRSs may be transmitted on symbols 0, 4, 7, and 11.

<Introduction of Small Cell>

It is expected that small cells with small cell coverage are added to the coverage of an existing cell in a next-generation mobile communication system and deal with greater traffic. The existing cell has relatively larger coverage than the small cells and thus is referred to as a macrocell, which is described with reference to FIG. 8.

Figure 8:
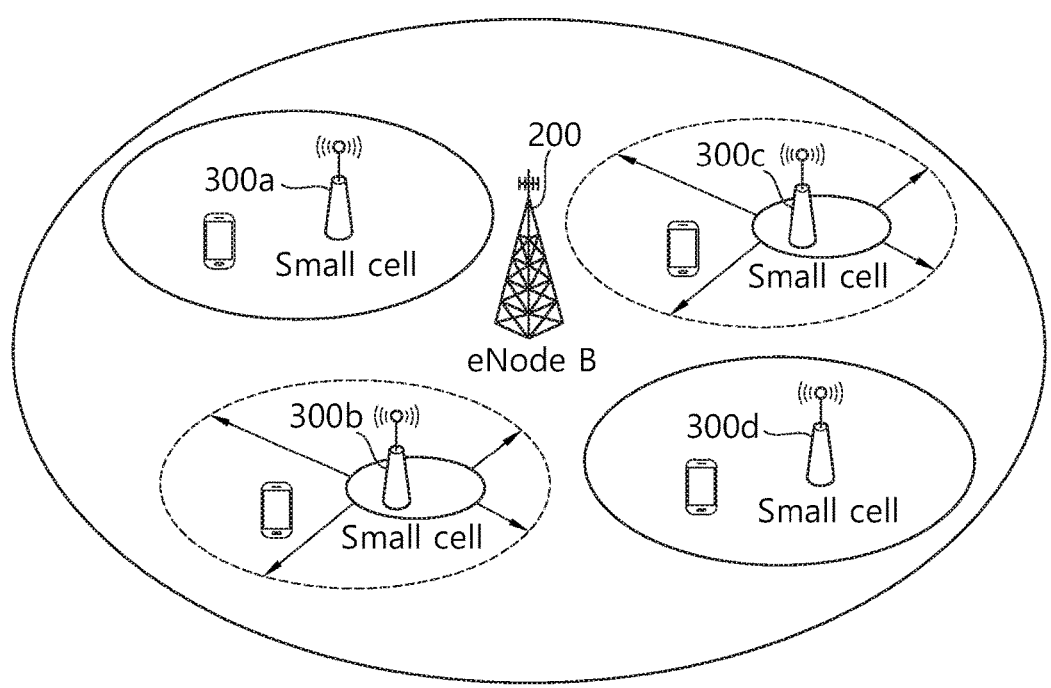
FIG. 8 illustrates an environment of a heterogeneous network including a macrocell and small cells as a potential next-generation wireless communication system.

FIG. 8 illustrates an environment of a heterogeneous network including a macrocell and small cells as a potential next-generation wireless communication system.

FIG. 8 shows a heterogeneous network environment in which a macrocell based on an existing BS 200 overlaps with small cells based on one or more small BSs 300*a*, 300*b*, 300*c*, and 300*d*. The existing BS provides relatively larger coverage than the small BSs and thus is also referred to as a macro BS (macro eNodeB: MeNB). In the present specification, a macrocell may be replaceable with a macro BS. A UE connected to the macrocell 200 may be referred to as a macro UE. The macro UE receives a downlink signal from the macro BS and transmits an uplink signal to the macro BS.

In this heterogeneous network, the macrocell is set as a primary cell (Pcell) and the small cells are set as secondary cells (Scell), thereby filling a gap in the macrocell coverage. Further, the small cells are set as primary cells (Pcell) and the macrocell is set as a secondary cell (Scell), thereby boosting overall performance.

The introduction of small cells, however, may aggravate inter-cell interference.

To address inter-cell interference, a UE 100 may use interference cancellation (IC) to perform reception, in addition to eICIC techniques.

Figure 9:
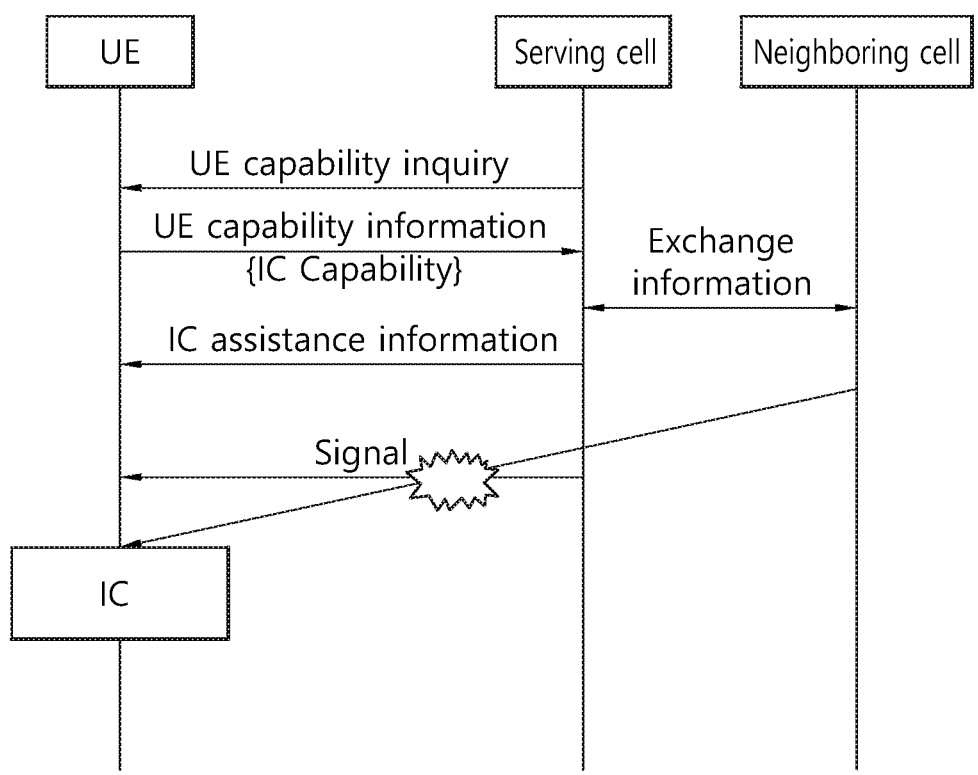
FIG. 9 is a signal flowchart illustrating a receiving method using interference cancellation.

FIG. 9 is a signal flowchart illustrating a receiving method using IC.

A serving cell makes a request for a UE capability inquiry to a UE 100 as necessary or according to an instruction from a higher layer.

The UE 100 provides UE capability information upon the request. That is, the UE 100*a* reports that the UE 100 has an eICIC capability and an IC capability through the UE capability information in response to the request for the UE capability inquiry. Meanwhile, when a radio access capability of the UE 100 is changed, a higher layer of the UE 100 may instruct the higher layer of the serving cell to make a request for a capability inquiry.

The serving cell may identify whether a neighbor cell is an aggressor cell causing interference through information exchanges with the neighbor cell. When the neighbor cell is an aggressor cell causing interference, the serving cell acquires information on a random channel of the neighbor cell.

Next, when the serving cell has a signal to transmit to the UE 100, the serving cell transmits IC support information including the acquired information on the random channel to the UE 100.

Subsequently, the serving cell transmits the signal to the UE 100.

Here, when the signal transmitted from the serving cell is interfered by a signal transmitted from the neighbor cell, the UE 100 performs IC.

Reception using IC is referred to as further enhanced ICIC (FeICIC).

When the interfering signal from the neighbor cell is cancelled, the SINR of the signal from the serving cell may be improved, resulting in a capability gain.

A signal or channel to be subjected to IC may be a cell-specific reference signal (CRS), a physical broadcasting channel (PBCH), a sync channel (SCH), a physical downlink shared channel (PDSCH), or the like.

However, when a PDSCH is subjected to IC, the serving cell may need to provide too much IC support information to the UE. Thus, when a PDSCH is subjected to IC, it may be more efficient for the UE to autonomously identify necessary information for IC.

Here, when a PDSCH is subjected to IC, the UE may take different operations for IC depending on a transmission mode (TM) in which the neighbor cell causing interference transmits the PDSCH.

<Disclosure of Present Specification>

Hereinafter, the present specification discloses an IC operation performed by a UE when a neighbor cell transmits a PDSCH using a CRS-based TM among different TMs, which is described below with reference to a drawing.

Figure 10:
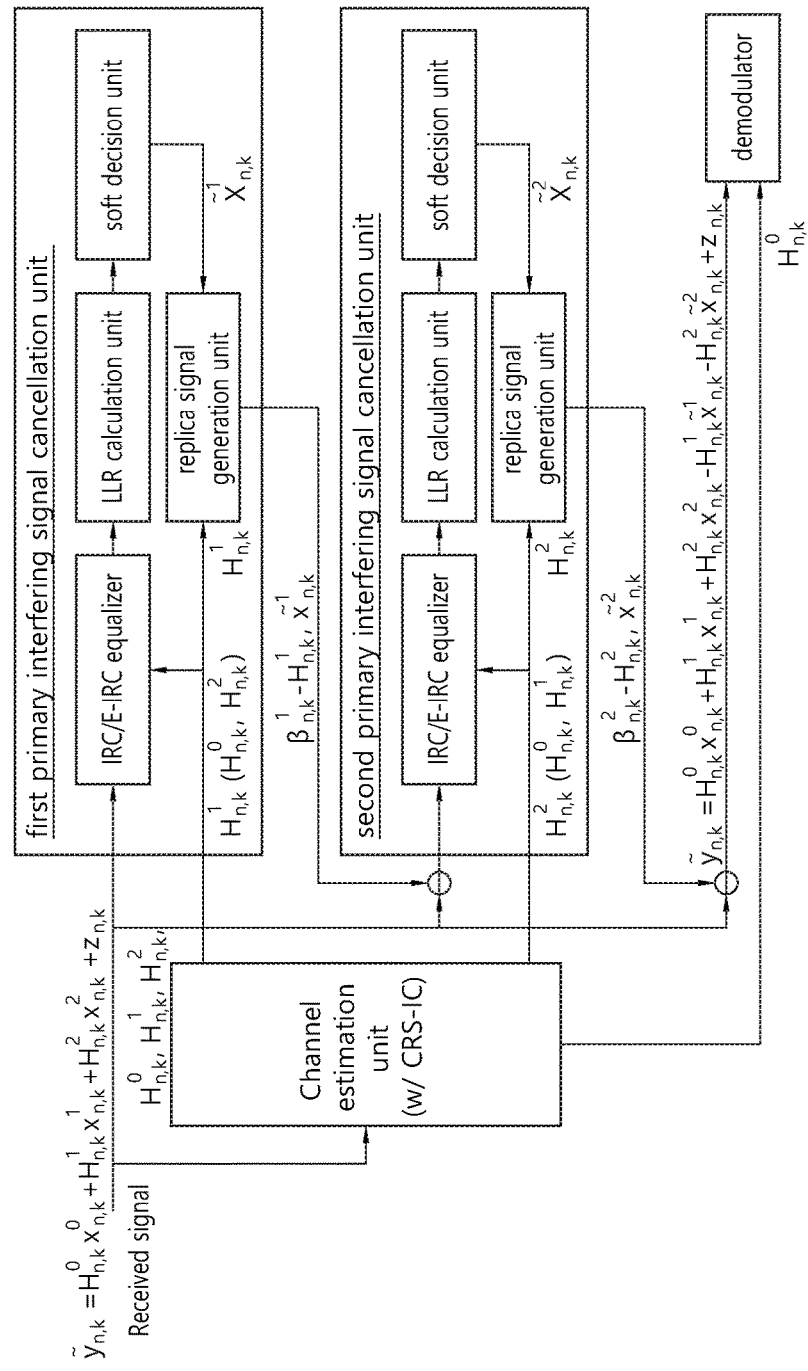
FIG. 10 illustrates a structure of an interference cancellation receiver according to a disclosure of the present specification.

FIG. 10 illustrates a structure an IC receiver according to a disclosure of the present specification.

The IC receiver illustrated in FIG. 10 has a structure to cancel an interfering signal from a neighbor cell in a symbol level and has a CRS IC capability.

Specifically, the IC receiver illustrated in FIG. 10 includes a channel estimation unit, two interfering signal cancellation units (that is, a first primary interfering signal cancellation unit and a second primary interfering signal cancellation unit), and a demodulator. Here, the two interfering signal cancellation units are illustrated assuming that there are two interference sources (that is, neighbor cells causing interference). However, it should be noted that the present invention is not limited to two interfering neighbor cells.

The first primary interfering signal cancellation unit and the second primary interfering signal cancellation unit each include an interference rejection combining (IRC)/enhanced interference rejection combining (E-IRC) equalizer, a log-likelihood (LLR) calculation unit, a soft decision unit, a replica signal generation unit.

The IRC/E-IRC equalizer of the first primary interfering signal cancellation unit estimates a first primary interfering signal in a received signal based on a channel estimated by the channel estimation unit. Subsequently, the LLR calculation unit calculates a log-likelihood ratio, and the soft decision unit determines a soft symbol. The replica signal generation unit generates and outputs a replica signal using the estimated channel and the soft symbol.

The second primary interfering signal cancellation unit receives an input obtained by removing the replica signal generated by the first primary interfering signal cancellation unit from the received signal. The IRC/E-IRC equalizer of the second primary interfering signal cancellation unit estimate a second primary interfering signal in the received signal based on a channel estimated by the channel estimation unit. Subsequently, the LLR calculation unit calculates a log-likelihood ratio, and the soft decision unit determines a soft symbol. The replica signal generation unit generates and outputs a replica signal using the estimated channel and the soft symbol.

The demodulator receives an input obtained by removing the replica signal generated by the second primary interfering signal cancellation unit from the received signal.

The foregoing details are mathematically illustrated as follows.

When there are two interfering neighbor cells, a received signal is modeled as follows.

$$y_{n,k}=H_{n,k}^0 x_{n,k}^0 + H_{n,k}^1 x_{n,k}^1 + H_{n,k}^2 x_{n,k}^2 + z_{n,k} \quad \text{[Equation 1]}$$

Here, $H_{n,k}^i$ denotes a precoded channel.

The channel estimation unit of the IC receiver estimates a channel matrix for a first cell causing a first primary interference using a CRS transmitted from the first cell causing the first primary interference.

Next, the IRC/E-IRC equalizer of the first primary interfering signal cancellation unit generates a weighting matrix for minimum mean square error (MMSE)-IRC for the first cell causing the first primary interference using the estimated channel matrix and a covariance matrix as follows.

$$w_{n,k}^i = \left(\sum_{i'=0}^{N_{cell}} \tilde{H}_{n,k}^{i'}(\tilde{H}_{n,k}^{i'})^H + \sigma_z^2 I\right)^{-1} (\tilde{H}_{n,k}^i)^H \quad \text{[Equation 2]}$$

Here, n denotes an nth OFDM symbol, and k denotes a kth RE.

Next, the IRC/E-IRC equalizer of the second primary interfering signal cancellation unit generates a weighting matrix for MMSE-IRC for a second cell causing a second primary interference using the estimated channel matrix and the covariance matrix as follows.

$$w_{n,k}^i = \left(\sum_{i'=0}^{N_{cell}} \beta_{n,k}^{i'} \tilde{H}_{n,k}^{i'}(\tilde{H}_{n,k}^{i'})^H + \sigma_z^2 I\right)^{-1} (\tilde{H}_{n,k}^i)^H \quad \text{[Equation 3]}$$

Here, $\beta_{n,k}^i$ denotes a variation in a regenerated signal after soft symbol mapping form IC, which is expressed as follows.

$$\beta_{n,k}^i = \sum_{x \in \Omega} |x|^2 Pr = (x_{n,k}^i = x) - |\tilde{x}_{n,k}^i|^2 \quad \text{[Equation 4]}$$

$$\tilde{x}_{n,k}^i = \sum_{x \in \Omega} x Pr(x_{n,k}^i = x)$$

Here, $\tilde{x}_{n,k}^i$ denotes a soft symbol.

The IC receiver operates according to different processes depending on whether a collision occurs between a CRS from a serving cell and a CRS from a neighbor cell.

Hereinafter, an IC method in the case where a collision occurs between a CRS from a serving cell and a CRS from a neighbor cell and an IC method in the case where no collision occurs between a CRS from a serving cell and a CRS from a neighbor cell are described. Here, a method of cancelling signals in order from high power signals to low power signals determined by comparing the received power strength of an interfering cell and the received power strength of a serving cell in each case is suggested.

Figure 11A:
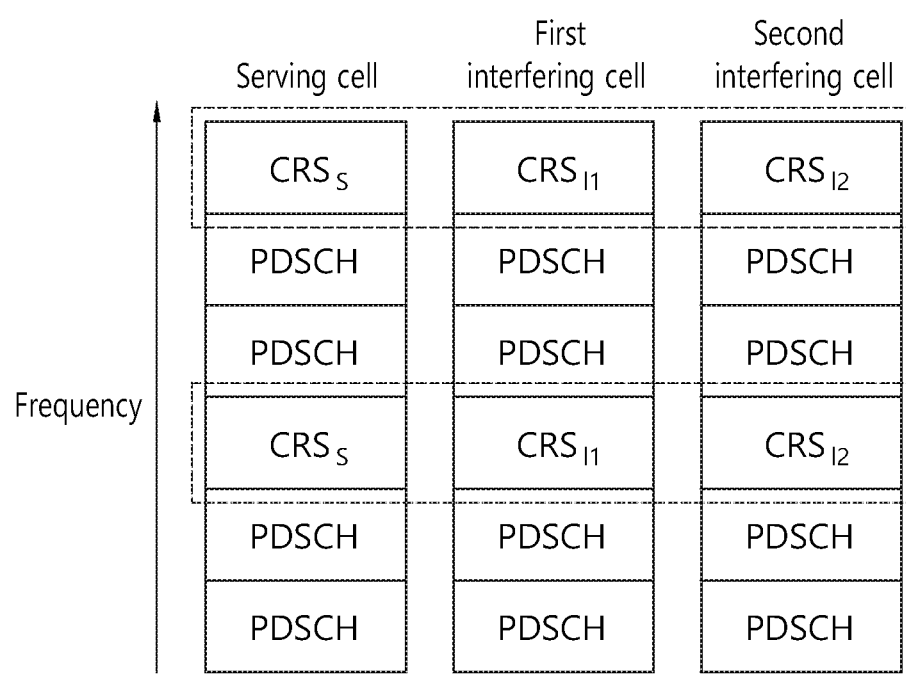
FIG. 11a illustrates that a collision occurs between a CRS from a serving cell and a CRS from a neighbor cell.

FIG. 11a illustrates that a collision occurs between a CRS from a serving cell and a CRS from a neighbor cell.

FIG. 11a shows a collision between CRSs of the serving cell and an interfering cell.

A receiving weighting matrix in a collision between the CRSs is illustrated below.

$$w_{IRC,C}^j = \left(\sum_{i=0}^{N_{cell}} H_{n,k}^i P_i (H_{n,k}^i P_i)^H + \sigma_z^2 I\right)^{-1} (H_{n,k}^i p_i)^H \quad \text{[Equation 5]}$$

$$= \left(\sum_{i'=0}^{D_{cell}-1} H_{n,k}^{i'} P_{i'} (H_{n,k}^{i'} P_{i'})^H + \sum_{\{n,k\} \in S_{CRS}^{IRC} \text{ or } S_{DMRS}^{IRC}} \tilde{y}_{n,k} \tilde{y}_{n,k}^H\right)^{-1} (H_{n,k}^i p_i)^H$$

$$\tilde{y}_{n,k} = y_{n,k} - \sum_{i=0}^{D_{cell}-1} H_{n,k}^i x_{n,k}^i$$

$$\tilde{y}_{n,k}^i = y_{n,k}^i - \sum_{i=0}^{D_{cell}-1} H_{n,k}^i x_{n,k}^i$$

Here, $x_{n,k}^i$ denotes a CRS or DMRS received from an ith BS on an nth OFDM symbol and a kth RE.

When a CRS collision or DMRS collision occurs between the serving cell and the neighbor cell, channel estimation performance may be reduced to lead to a decrease in the accuracy of a covariance matrix. Therefore, to improve the accuracy of the covariance matrix, CRS-IC or DMRS-IC is necessarily considered for E-LMMSE-IRC.

Successive IC considering CRS-IC may operate in a different order according to the strengths of an interfering signal and a serving signal as illustrated below.

Figure 11B:
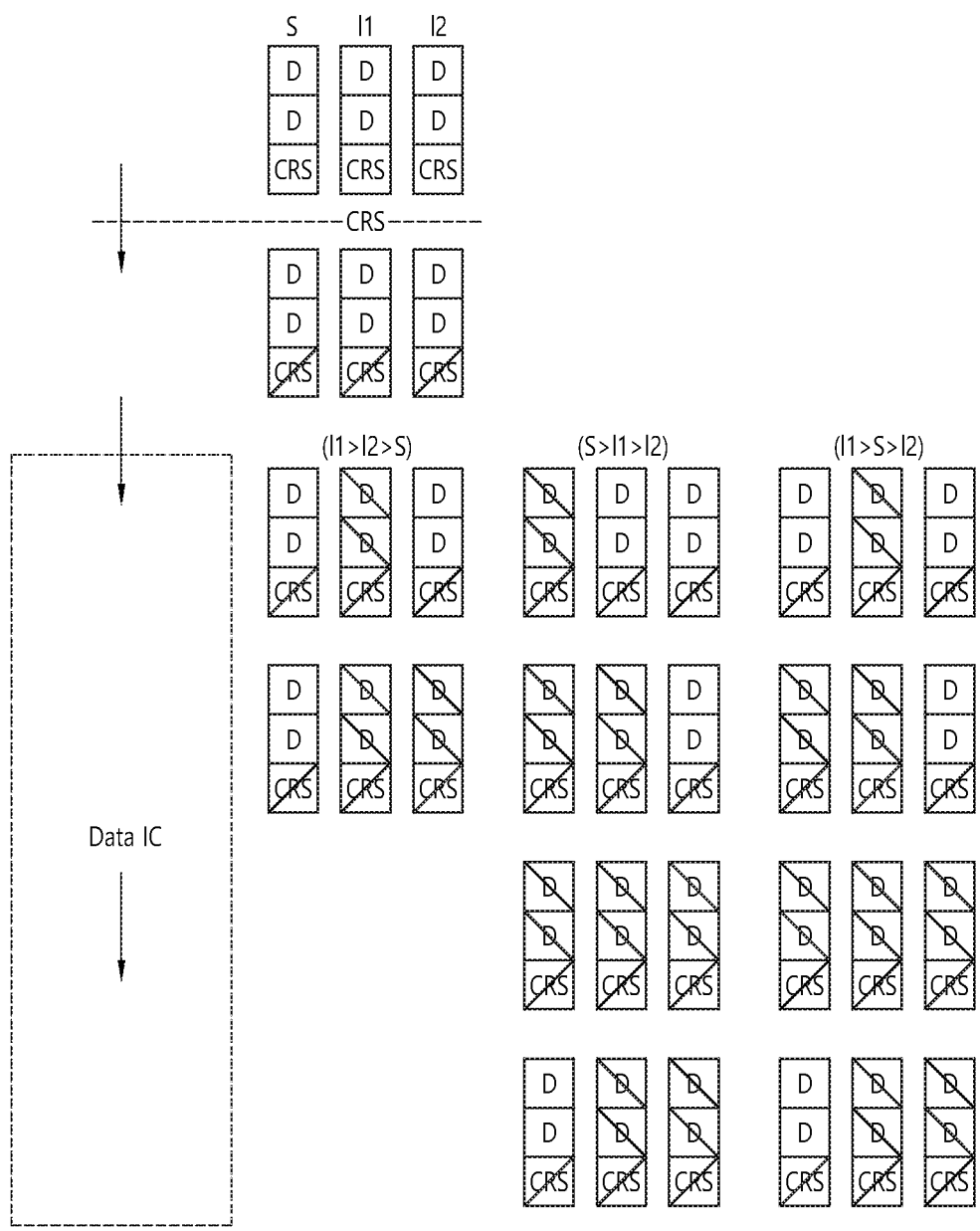
FIG. 11b illustrates an IC operation performed when a collision occurs between a CRS from a serving cell and a CRS from a neighbor cell.

FIG. 11b illustrates an IC operation performed when a collision occurs between a CRS from a serving cell and a CRS from a neighbor cell.

Referring to FIG. 11b, RBs are shown in order of RBs for a serving cell (S), a first interfering cell (I1), and a second interfering cell (I2).

Referring to the top of FIG. 11b, a CRS is first removed through IC, after which data IC is performed. Data IC may operate in a different order according to the strengths of an interfering signal and a serving signal.

For example, when the strengths of received signals are in order of first interfering cell (I1)>second interfering cell (I2)>serving cell (S), a data signal of the first interfering cell (I1) is removed, after which a data signal of the second interfering cell (I2) is removed.

For second example, when the strengths of received signals are in order of serving cell (S)>first interfering cell (I1)>second interfering signal (I2), a data signal of the serving cell (S) is removed, followed by removing a data signal of the first interfering cell (I1) and removing a data signal of the second interfering cell (I2), after which a data signal of the serving cell (S) is regenerated.

For third example, when the strengths of received signals are in order of first interfering signal (I1)>serving cell (S)>second interfering signal (I2), a data signal of the first interfering signal cell (I1) is removed, followed by removing a data signal of the serving cell (S) and removing a data signal of the second interfering cell (I2), after which a data signal of the serving cell (S) is regenerated.

Figure 12A:
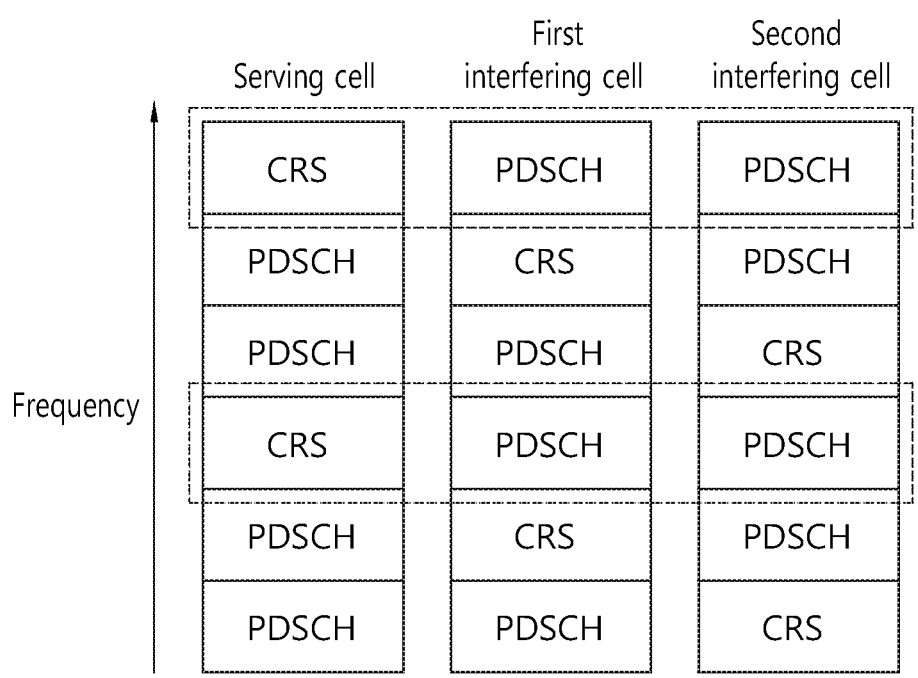
FIG. 12a illustrates that no collision occurs between a CRS from a serving cell and a CRS from a neighbor cell.

FIG. 12a illustrates that no collision occurs between a CRS from a serving cell and a CRS from a neighbor cell.

As illustrated in FIG. 12a, even though a CRS from a serving cell and a CRS from an interfering neighbor cell do not overlap, a collision between the CRS from the interfering neighbor cell and a data channel (that is, PDSCH) from the serving cell occurs.

When no collision occurs between the CRS from the interfering neighbor cell and the PDSCH from the serving cell, it is difficult to measure adjustable interference $\tilde{r}$.

In one possible method, data symbol information from the interfering cell is detected in the position of an RE in which a CRS is received from the serving cell to derive a covariance matrix. Here, it may be assumed as below that a weighting matrix is the same as a weighting matrix for LMMSE-IRC.

$$w^j_{IRC,N} = \left( \sum_{i=0}^{N_{cell}} H^i_{n,k} P_i (H^i_{n,k} P_i)^H + \sigma_z^2 I \right)^{-1} (H^j_{n,k} p_i)^H \quad \text{[Equation 6]}$$

$$= \left( \sum_{\{n,k\} \in S^{IRC}_{CRS} \text{ or } S^{IRC}_{DMRS}} y_{n,k} y^H_{n,k} \right)^{-1} (H^j_{n,k} p_i)^H.$$

When no collision occurs between the CRS from the serving cell and the CRS from the neighbor cell, successive IC considering CRS-IC may operate in a different order according to the strengths of an interfering signal and a serving signal as illustrated below.

Figure 12B:
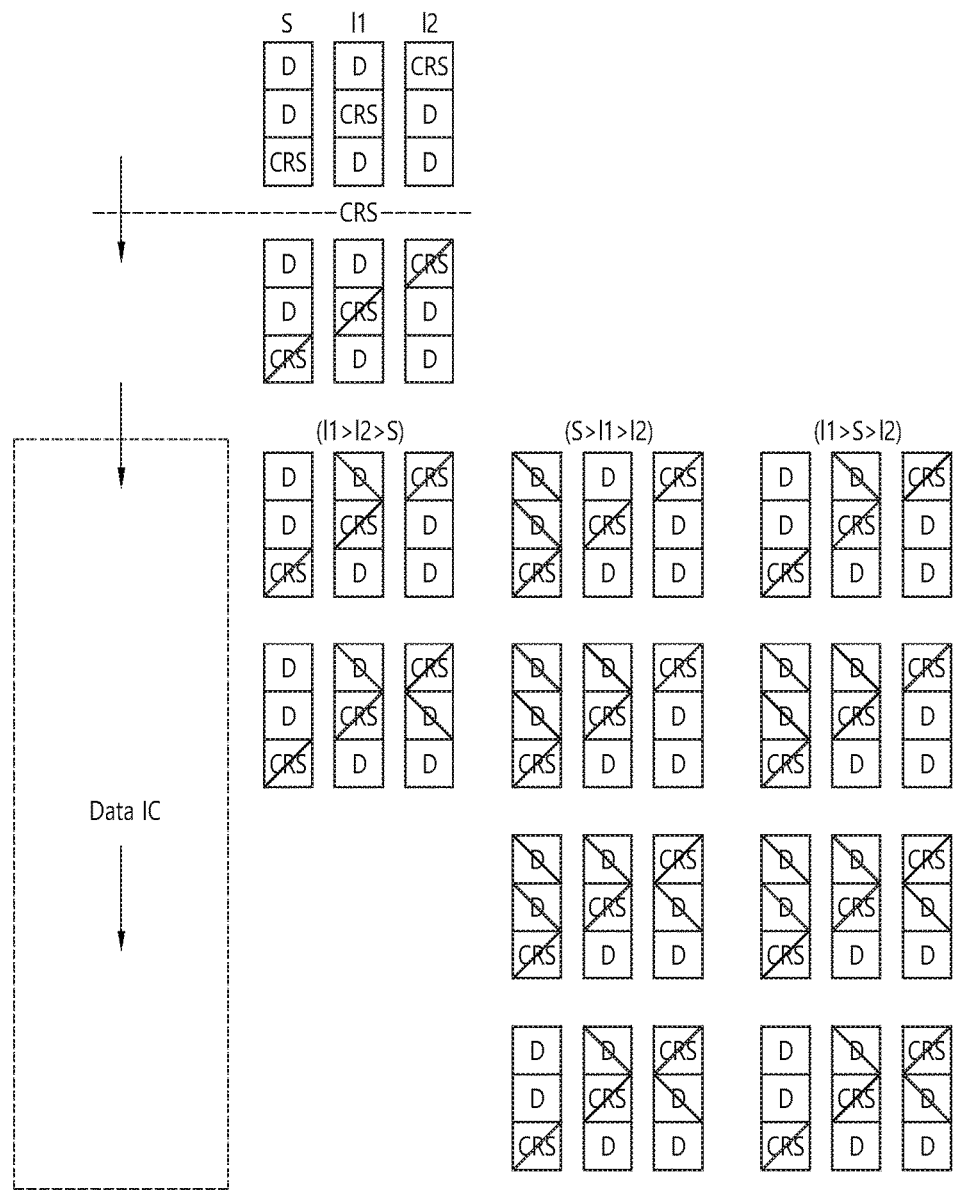
FIG. 12b illustrates an IC operation performed when no collision occurs between a CRS from a serving cell and a CRS from a neighbor cell.

FIG. 12b illustrates an IC operation performed when no collision occurs between a CRS from a serving cell and a CRS from a neighbor cell.

Referring to the top of FIG. 12b, a CRS is first removed through IC, after which data IC is performed. Data IC may operate in a different order according to the strengths of an interfering signal and a serving signal.

For example, when the strengths of received signals are in order of first interfering cell (I1)>second interfering cell (I2)>serving cell (S), a data signal of the first interfering cell (I1), which collides with a CRS of the second interfering cell (I2), is removed, after which a data signal of the second interfering cell (I2), which collides with a CRS of the first interfering cell (I1), is removed.

For second example, when the strengths of received signals are in order of serving cell (S)>first interfering cell (I1)>second interfering signal (I2), a data signal of the serving cell (S), which collides with a CRS of the first interfering cell (I1) and a CRS of the second interfering cell (I2), is removed, followed by removing a data signal of the first interfering cell (I1), which collides with CRS of the second interfering cell (I2), and removing a data signal of the second interfering cell (I2), which collides with the CRS of the first interfering cell (I1), after which a data signal of the serving cell (S) is regenerated.

For third example, when the strengths of received signals are in order of first interfering signal (I1)>serving cell (S)>second interfering signal (I2), a data signal of the first interfering signal cell (I1) is removed, followed by removing a data signal of the serving cell (S), which collides with a CRS of the first interfering cell (I1) and a CRS of the second interfering cell (I2), and removing a data signal of the second interfering cell (I2), which collides with the CRS of the first interfering cell (I1), after which a data signal of the first interfering cell (I1) is regenerated.

Figure 13A:
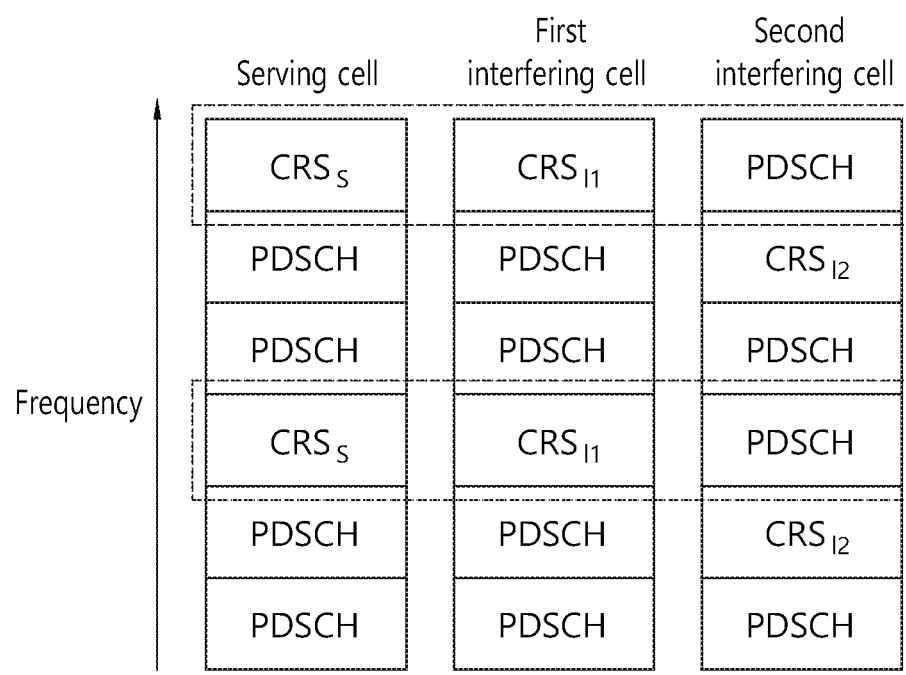
FIG. 13a illustrates that a CRS from a serving cell collides with a CRS from a first interfering cell but does not collide with a CRS from a second interfering cell.
Figure 13B:
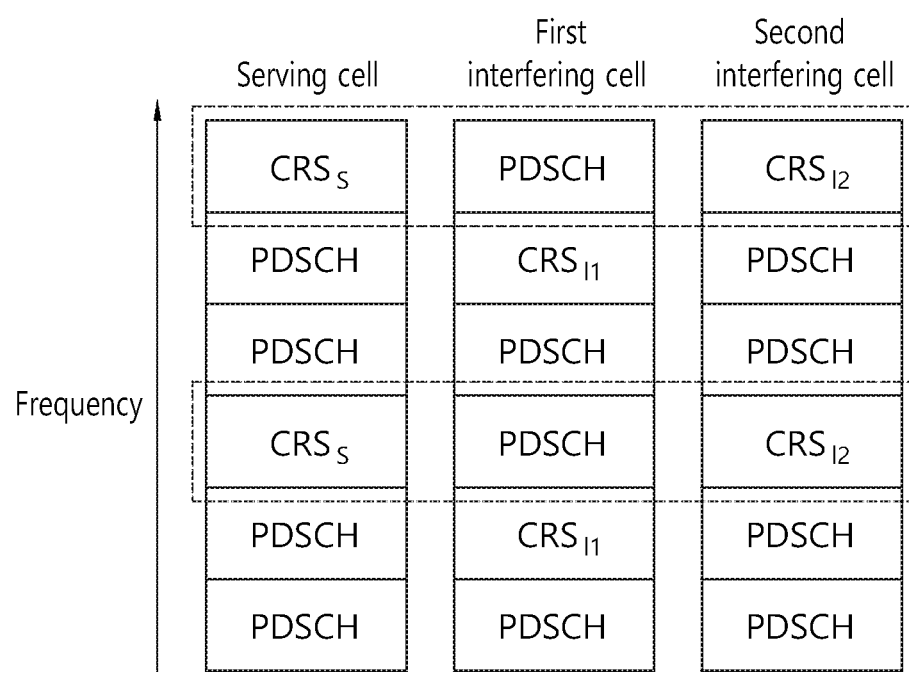
FIG. 13b illustrates that a CRS from a serving cell does not collide with a CRS from a first interfering cell but collides with a CRS from a second interfering cell.

FIG. 13a illustrates that a CRS from a serving cell collides with a CRS from a first interfering cell but does not collide with a CRS from a second interfering cell, and FIG. 13b illustrates that a CRS from a serving cell does not collide with a CRS from a first interfering cell but collides with a CRS from a second interfering cell.

As illustrated in FIG. 13a and FIG. 13b, when a CRS from a serving cell collides with a CRS from one interfering cell but does not collide with a CRS from another interfering cell, a weighting matrix for LMMSE-IRC is illustrated as follows.

$$w^i_{Rx,col} = (\tilde{\mathbf{H}}^i_{n,k} P_0)^H (R^{-0}_{n,k})^{-1} = (\tilde{\mathbf{H}}^i_{n,k} P_0)^H \quad \text{[Equation 7]}$$

$$\left( \sum_{i=1}^{D_{col\text{-}cell}} (\tilde{\mathbf{H}}^i_{n,k} P_i)(\tilde{\mathbf{H}}^i_{n,k} P_i)^H + \frac{1}{N_{RE}} \sum_{n,k \in CRS} \tilde{y}^i_{n,k} (\tilde{y}^i_{n,k})^H \right)^{-1}$$

$$\tilde{y}^i_{n,k} = y^i_{n,k} - \sum_{i=0}^{D_{col\text{-}cell}} \tilde{\mathbf{H}}^i_{n,k} x^i_{n,k}$$

Here, $D_{col\text{-}cell}$ denotes the number of interfering cells that transmit CRSs to collide with the CRS from the serving cell.

Assuming that a UE has two receiving antennas, there are two primary interfering cells, a first interfering cell (I1) has a higher received power than a second interfering cell (I2), a CRS from the first interfering cell (I1) collides with a CRS from a serving cell, the second interfering cell (I2) is considered to hardly have an impact on overall performance, because E-LMMSE-IRC practically suppresses interference by the first interfering cell (I1) having a higher power. Thus, IC on the second interfering cell (I2) may be omitted.

Figure 13C:
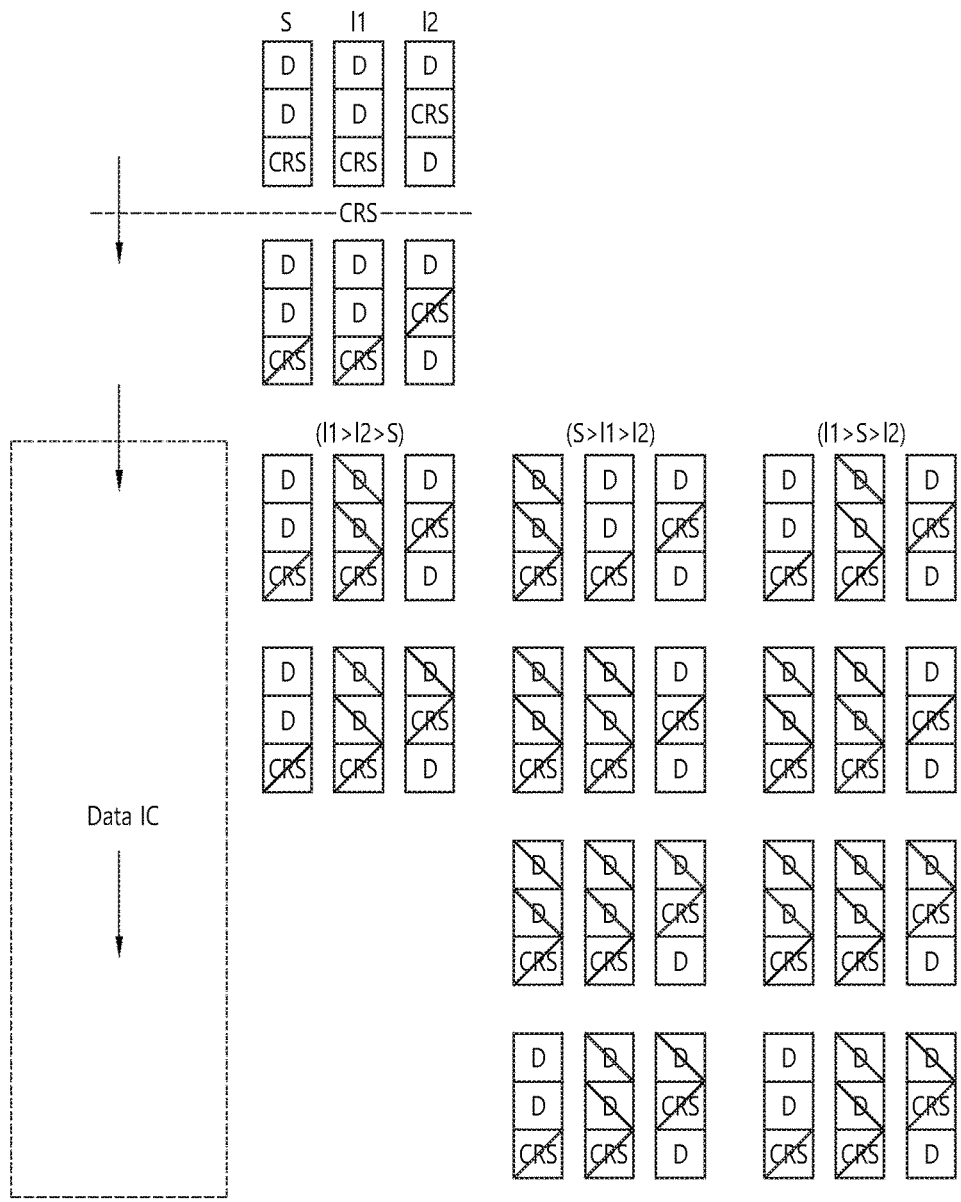
FIG. 13c illustrates an IC operation performed when a CRS from a serving cell collides with a CRS from one interfering cell but does not collide with a CRS from another interfering cell.

FIG. 13c illustrates an IC operation performed when a CRS from a serving cell collides with a CRS from one interfering cell but does not collide with a CRS from another interfering cell.

Referring to the top of FIG. 13c, a CRS is first removed through IC, after which data IC is performed. Data IC may operate in a different order according to the strengths of an interfering signal and a serving signal.

For example, when the strengths of received signals are in order of first interfering cell (I1)>second interfering cell (I2)>serving cell (S), a data signal of the first interfering cell (I1) is removed, after which a data signal of the second interfering cell (I2), which does not collide with a CRS of the serving cell and a CRS of the second serving cell (I2), is removed.

For second example, when the strengths of received signals are in order of serving cell (S)>first interfering cell (I1)>second interfering signal (I2), a data signal of the serving cell (S) is removed, followed by removing a data signal of the first interfering cell (I1) and removing a data signal of the second interfering cell (I2), which does not collide with a CRS of the serving cell and a CRS of the first serving cell (I1), after which a data signal of the serving cell (S) is regenerated.

For third example, when the strengths of received signals are in order of first interfering signal (I1)>serving cell (S)>second interfering signal (I2), a data signal of the first interfering signal cell (I1) is removed, followed by removing a data signal of the serving cell (S) and removing a data signal of the second interfering cell (I2), which does not collide with a CRS of the serving cell and a CRS of the first serving cell (I1), after which a data signal of the serving cell (S) is regenerated.

Figure 14A:
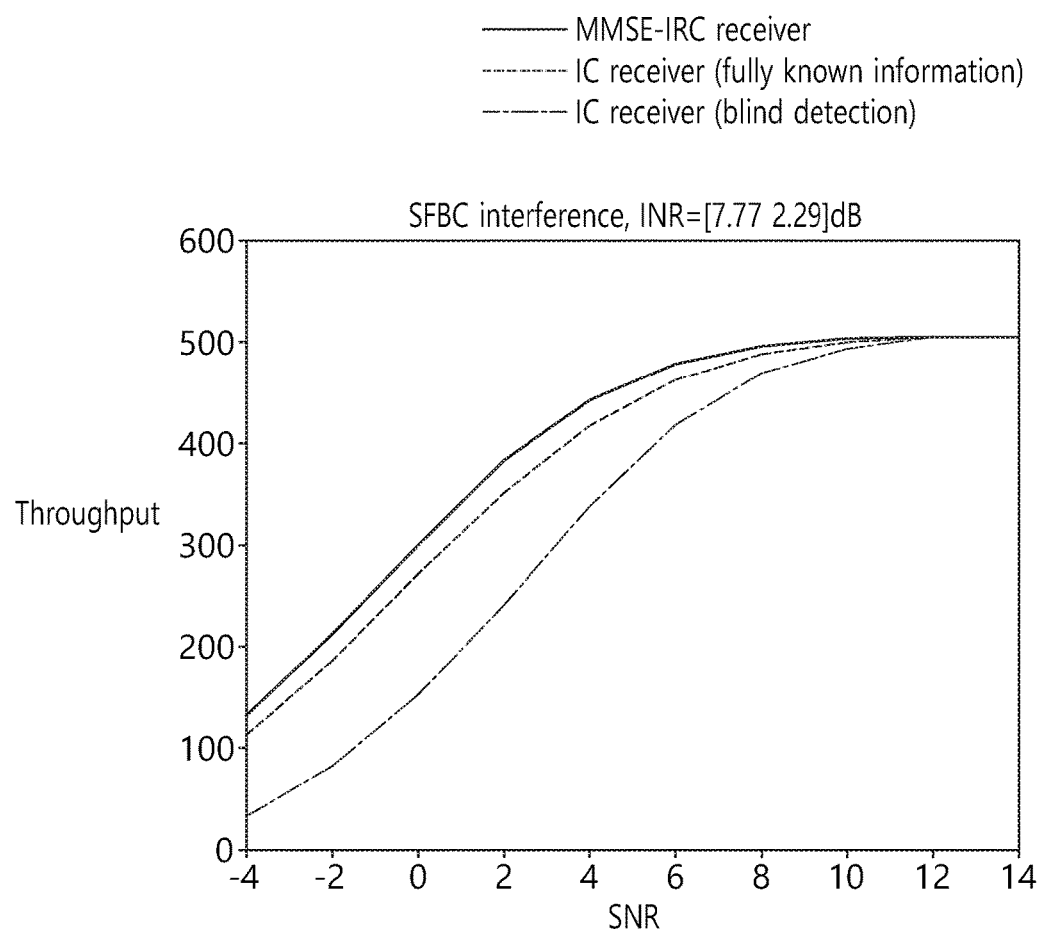
FIG. 14a and FIG. 14b are graphs illustrating the performance of an IC receiver according to a disclosure of the present specification.
Figure 14B:
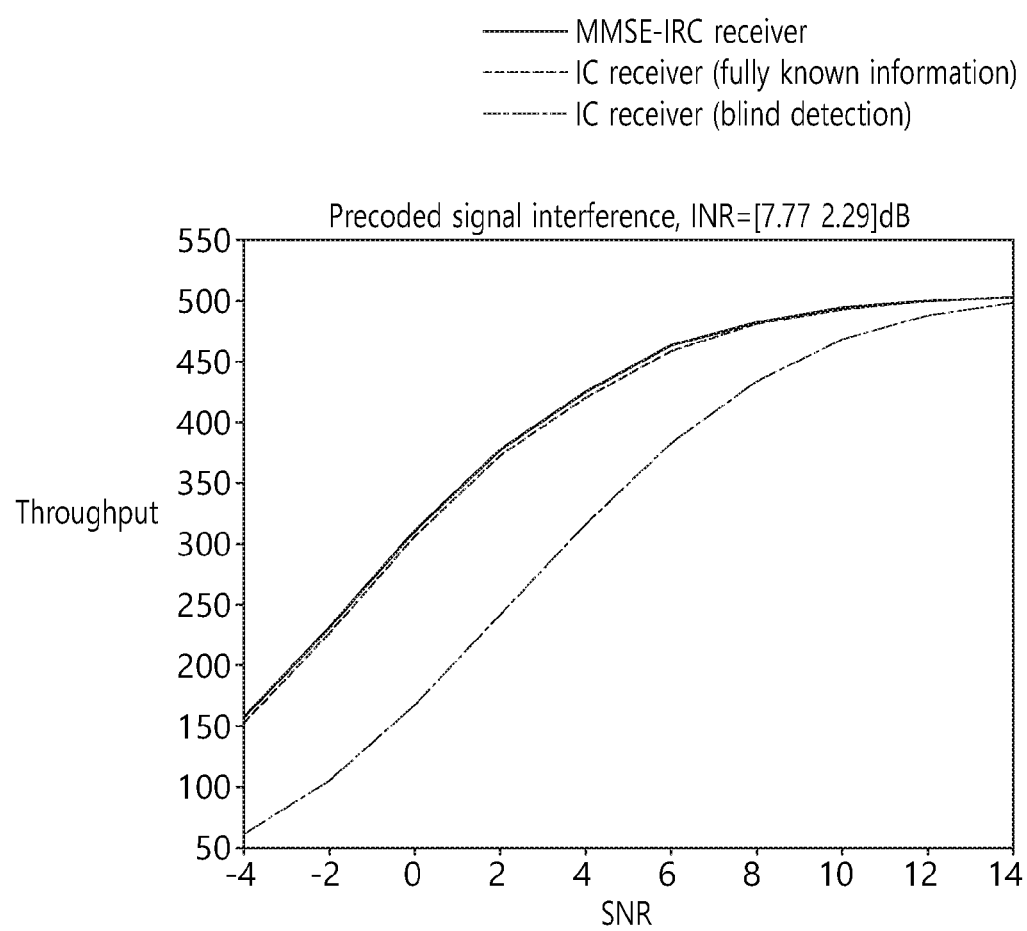

FIG. 14a and FIG. 14b are graphs illustrating the performance of an IC receiver according to a disclosure of the present specification.

FIG. 14a illustrates the performance in the case where interference is SFBD, and FIG. 14b illustrates the performance in the case where interference is a precoded signal.

In FIG. 14a and FIG. 14b, blind detection indicates that blind detection is performed on interference signal information.

Referring back to FIG. 10, after soft decision, a weighting is assigned to all signal constellation candidates to generate a soft symbol copy. Here, $\lambda(b_j)$ may be the LLR of an ith soft bit in symbol $\tilde{x}$. A bit probability that $b_j$ is 0 or 1 may be readily derived from the LLR.

$$P(b_j = 0) = \frac{\exp[\lambda(b_j)]}{1 + \exp[\lambda(b_j)]}$$ [Equation 8]

$$P(b_j = 1) = \frac{\exp[-\lambda(b_j)]}{1 + \exp[-\lambda(b_j)]} = \frac{1}{1 + \exp[\lambda(b_j)]}$$

Figure 15A:
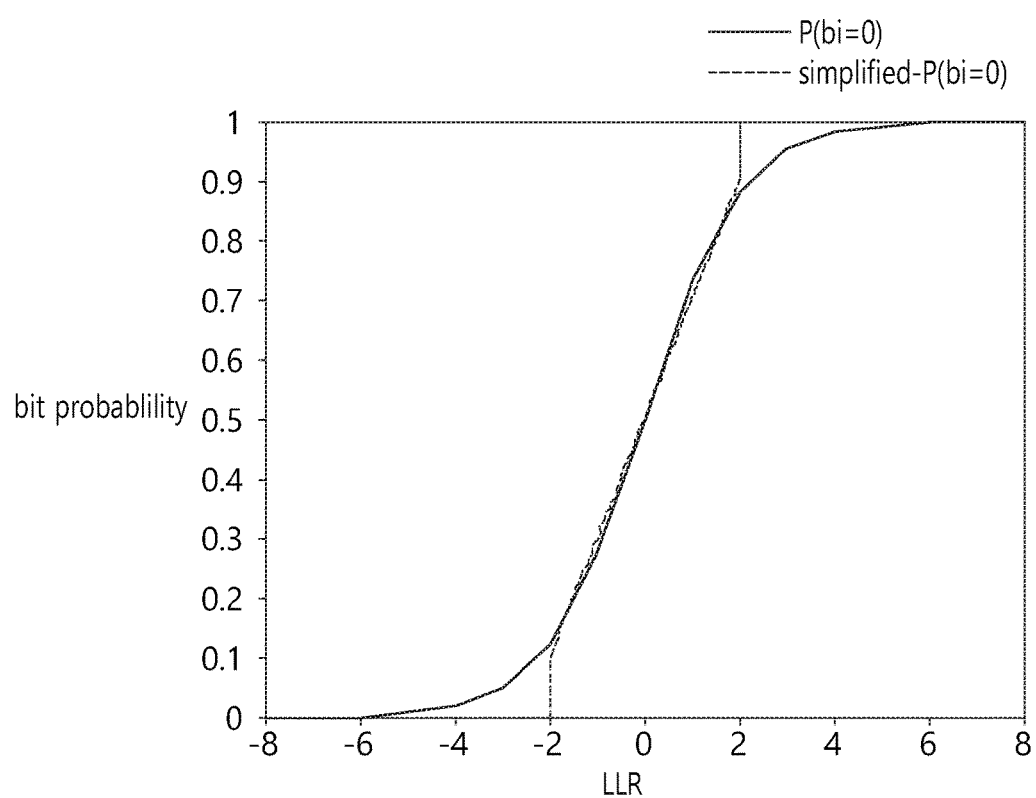
FIG. 15a is a graph illustrating an LLR according to bit probability.

FIG. 15a is a graph illustrating an LLR according to bit probability.

Referring to FIG. 15a, a complex exponential function may become simple by simplifying a portion with an LLR of −2.

Accordingly, Equation 8 may be simplified as follows.

$$P(b_j = 0) = \begin{cases} 0.2 \times LLR + 0.5 & -2 < LLR < 2 \\ 0 & LLR \leq -2 \\ 1 & LLR \geq 2 \end{cases}$$ [Equation 9]

For example, in QPSK, $\tilde{x}$ is soft-estimated as follows.

$$\tilde{x} = \sum_{c=0}^{3} s^c \prod_{j=0}^{1} P(b_j = s_j^c)$$

In 16 QAM, $\tilde{x}$ is soft-estimated as follows.

$$\tilde{x} = \sum_{c=0}^{15} s^c \prod_{j=0}^{1} P(b_j = s_j^c)$$ [Equation 11]

Here, $S^C$ is constellation points of QPSK and 16 QAM.

Figure 15B:
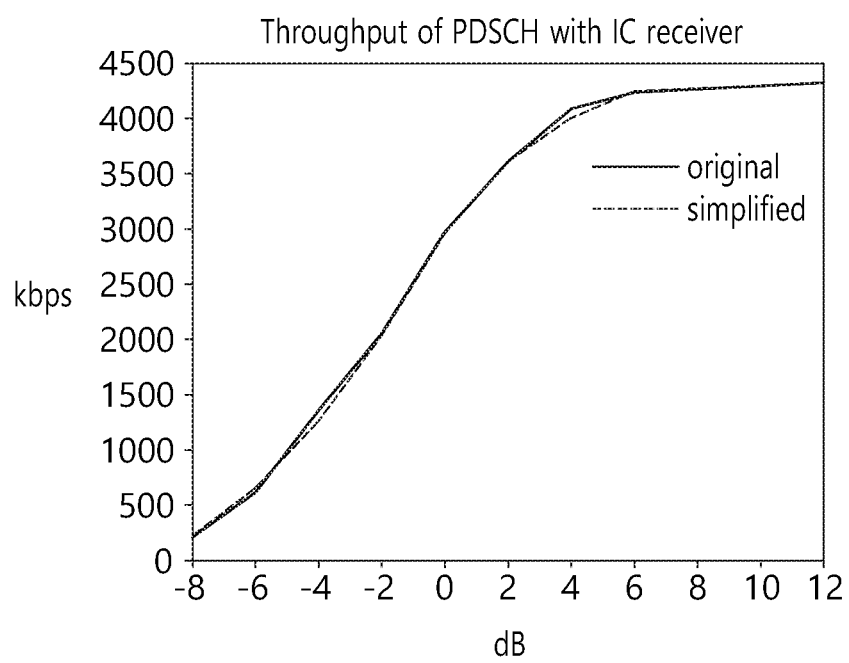
FIG. 15b illustrates performance through an IC receiver according to a disclosure of the present specification.

FIG. 15b illustrates performance through an IC receiver according to a disclosure of the present specification.

Referring to FIG. 15b, when there are two interfering sources having INR=13.93 dB and 3.34 dB and a modulation order of 2, there is no significant difference in performance on the simplified soft symbol decision.

The aforementioned embodiments of the present invention may be implemented by various means. For example, the embodiments of the present invention may be implemented in hardware, firmware, software, or combinations thereof, which will be described in detail with reference to a drawing.

Figure 16:
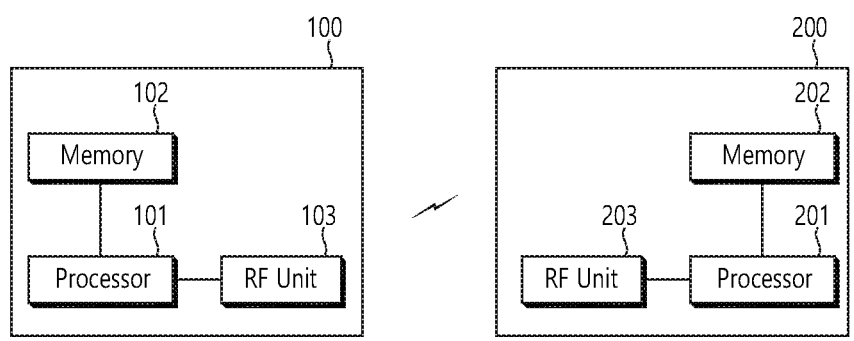
FIG. 16 is a block diagram illustrating a wireless communication system according to a disclosure of the present specification.

FIG. 16 is a block diagram illustrating a wireless communication system according to a disclosure of the present specification.

A BS 200 includes a processor 201, a memory 202, and a radio frequency (RF) unit 203. The memory 202 is connected with the processor 201 and stores various pieces of information for driving the processor 201. The RF unit 203 is connected with the processor 201 and transmits and/or receives radio signals. The processor 201 implements the proposed functions, procedures, and/or methods. In the aforementioned embodiments, operations of the BS may be implemented by the processor 201.

A UE 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements the proposed functions, procedure, and/or methods.

The processors may include an application-specific integrated circuit (ASIC), a separate chipset, a logic circuit, and/or a data processing unit. The memories may include a read-only memory (ROM), a random access memory (RAM), a flash memory, a memory card, a storage medium, and/or other equivalent storage devices. The RF units may include a base-band circuit for processing a radio signal. When the embodiment of the present invention is implemented in software, the aforementioned methods can be implemented with a module (i.e., process, function, etc.) for performing the aforementioned functions. The module may be stored in the memories and may be performed by the processors. The memories may be located inside or outside the processors, and may be coupled to the processors by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for performing an interference cancellation, the method comprising:
   receiving, from a serving cell, signals which are interfered with signals from a first primary interfering cell and a second primary interfering cell;
   first removing, from the signals which are interfered with the signals from the first primary interfering cell and the second primary interfering cell, a cell-specific reference signal (CRS) from the serving cell, a CRS from the first primary interfering cell, and a CRS from the second primary interfering cell;
   comparing signal strength of the serving cell, signal strength of the first primary interfering cell, and signal strength of the second primary interfering cell;
   determining whether the CRS of the serving cell collides with the CRS of the first primary interfering cell and the CRS of the second primary interfering cell; and
   second removing, from the signals from which the CRSs are removed, a data signal from the first primary interfering cell and a data signal from the second primary interfering cell according to an order determined by comparing the signal strengths when it is determined that the CRSs collide with each other.

2. The method of claim 1, wherein if it is determined that the CRSs collide with each other, the second removing of the data signals comprises:
   third removing, from the signals from which the CRSs are removed, the data signal from the first primary interfering cell if a result of the comparing of the signal strengths indicates the signal strength of the first primary interfering cell>the signal strength of the second primary interfering cell>the signal strength of the serving cell; and
   fourth removing, from the remaining signals after the third removing, the data signal from the second primary interfering cell.

3. The method of claim 1, wherein if it is determined that the CRSs collide with each other, the second removing of the data signals comprises:
   third removing, from the signals from which the CRSs are removed, a data signal from the serving cell, if a result of the comparing of the signal strengths indicates the signal strength of the serving cell>the signal strength of the first primary interfering cell>the signal strength of the second primary interfering cell;
   fourth removing, from the remaining signals after the third removing, the data signal from the first primary interfering cell; and
   regenerating the data signal from the serving cell.

4. The method of claim 1, wherein if it is determined that the CRSs collide with each other, the second removing of the data signals comprises:
   third removing, from the signals from which the CRSs are removed, the data signal from the first primary interfering cell, if a result of the comparing of the signal strengths indicates the signal strength of the first primary interfering cell>the signal strength of the serving cell>the signal strength of the second primary interfering cell;
   fourth removing, from the remaining signals after the third removing, a data signal from the serving cell;
   fifth removing, from the remaining signals after the fourth removing, the data signal from the second primary interfering cell; and
   regenerating the data signal from the serving cell.

5. The method of claim 1, further comprising
   third removing, from the signals from which the CRSs are removed, a first part of the data signal from the first primary interfering cell and a second part of the data signal from the second primary interfering cell according to the order determined by comparing the signal strengths when it is determined that the CRSs do not collide with each other.

6. The method of claim 5, wherein if it is determined that the CRSs do not collide with each other, the third removing of the first and second parts of the data signals comprises:
   fourth removing, from the signals from which the CRSs are removed, only the first part of the data signal from the first primary interfering cell which is overlapped with the CRS of the second primary interfering cell, if a result of the comparing of the signal strengths indicates the signal strength of the first primary interfering cell>the signal strength of the second primary interfering cell>the signal strength of the serving cell; and
   fifth removing, from the remaining signals after the fourth removing, only the second part of the data signal from the second primary interfering cell which is overlapped with the CRS of the first primary interfering cell.

7. The method of claim 5, wherein if it is determined that the CRSs do not collide with each other, the third removing of the first and second parts of the data signals comprises:
   fourth removing, from the signals from which the CRSs are removed, a data signal from the serving cell, which is overlapped with the CRS of the first primary interfering cell and the CRS of the second primary interfering cell, if a result of the comparing of the signal strengths indicates the signal strength of the serving cell>the signal strength of the first primary interfering cell>the signal strength of the second primary interfering cell;
   fifth removing, from the remaining signals after the fourth removing, only the first part of the data signal from the first primary interfering cell which is overlapped with the CRS of the second primary interfering cell;
   sixth removing, from the remaining signals after the fourth removing, only the second part of the data signal from the second primary interfering cell which is overlapped with the CRS of the first primary interfering cell; and
   regenerating the data signal from the serving cell.

8. The method of claim 5, wherein if it is determined that the CRSs do not collide with each other, the third removing of the first and second parts of the data signals comprises:
   fourth removing, from the signals from which the CRSs are removed, only the first part of the data signal from the first primary interfering cell which is overlapped with the CRS of the first primary interfering cell, if a result of the comparing of the signal strengths indicates the signal strength of the first primary interfering cell>the signal strength of the serving cell>the signal strength of the second primary interfering cell;
   fifth removing, from the remaining signals after the fourth removing, a data signal from the serving cell, which is overlapped with the CRS of the first primary interfering cell and the CRS of the second primary interfering cell;
   sixth removing, from the remaining signals after the fourth removing, only the second part of the data signal from the second primary interfering cell which is overlapped with the CRS of the first primary interfering cell; and
   regenerating the data signal from the serving cell.

9. The method of claim 1, further comprising
   third removing, from the signals from which the CRSs are removed, a first part of the data signal from the first primary interfering cell and a second part of the data signal from the second primary interfering cell according to the order determined by comparing the signal strengths when it is determined that the CRS of the serving cell collides with only one of the CRS of the first primary interfering cell and the CRS of the second primary interfering cell.

10. The method of claim 9, wherein if it is determined that the CRS of the serving cell collides with only one of the CRS of the first primary interfering cell and the CRS of the second primary interfering cell, the third removing of the first and second parts of the data signals comprises:
    fourth removing, from the signals from which the CRS s are removed, the data signal from the first primary interfering cell, if a result of the comparing of the signal strengths indicates the signal strength of the first primary interfering cell>the signal strength of the second primary interfering cell>the signal strength of the serving cell; and
    fifth removing, from the remaining signals after the fourth removing, only the second part of the data signal from the second primary interfering cell.

* * * * *